United States Patent [19]

Ramsauer

[11] Patent Number: 4,930,325
[45] Date of Patent: Jun. 5, 1990

[54] PIVOT LEVER BAR CLOSURE

[76] Inventor: Dieter Ramsauer, Am Neuhauskothen 20, D-4620 Velbert 11, Fed. Rep. of Germany

[21] Appl. No.: 214,742
[22] PCT Filed: Sep. 12, 1987
[86] PCT No.: PCT/DE87/00415
  § 371 Date: May 25, 1988
  § 102(e) Date: May 25, 1988

[30] Foreign Application Priority Data
  Sep. 25, 1986 [DE] Fed. Rep. of Germany ..... 86113172

[51] Int. Cl.$^5$ ............................................. E05B 13/10
[52] U.S. Cl. ........................................ 70/209; 70/215; 292/39; 292/337; 292/DIG. 68
[58] Field of Search ................................. 70/209–217; 292/39, 337, DIG. 68

[56] References Cited
U.S. PATENT DOCUMENTS

| 1,729,038 | 9/1929 | French | 292/DIG. 68 X |
| 1,883,119 | 10/1932 | Toncray | 292/DIG. 68 X |
| 2,500,849 | 3/1950 | Menns | 292/39 X |
| 2,825,219 | 3/1958 | Marziller | 292/DIG. 68 X |
| 2,835,523 | 5/1958 | Chervenka | 292/DIG. 68 X |
| 3,095,727 | 7/1963 | Kerr | 292/337 X |
| 3,158,016 | 11/1964 | Fay | 292/DIG. 68 X |
| 3,478,919 | 11/1969 | Turpen | 292/39 X |
| 4,616,864 | 10/1986 | Douglas | 292/39 X |
| 4,648,636 | 3/1987 | Reynard | 292/39 |
| 4,754,624 | 7/1988 | Fleming et al. | 292/39 X |

FOREIGN PATENT DOCUMENTS

| 0283659 | 9/1988 | European Pat. Off. | 292/39 |
| 2429893 | 1/1976 | Fed. Rep. of Germany | 292/39 |

Primary Examiner—Gary L. Smith
Assistant Examiner—Suzanne L. Dino
Attorney, Agent, or Firm—Darby & Darby

[57] ABSTRACT

A pivot lever bar closure in the fillet gap of sheet metal cabinet doors. This bar closure is provided with a cylinder lock that is installed into two identical rectangular apertures. The bar closure consists of a lock case and cylinder lock. The lock case has a pivot lever actuating device that is led through the door panel to the outside. This pivot lever drives one or more bar closures of flat strip material that extends parallel to the door edge of the fillet gap. The cylinder lock holds the pivot lever firm in its hinged-in position. The pivot lever closure comprises a base plate forming the receiving trough for the pivot lever which connects the closure with the door panel.

18 Claims, 20 Drawing Sheets

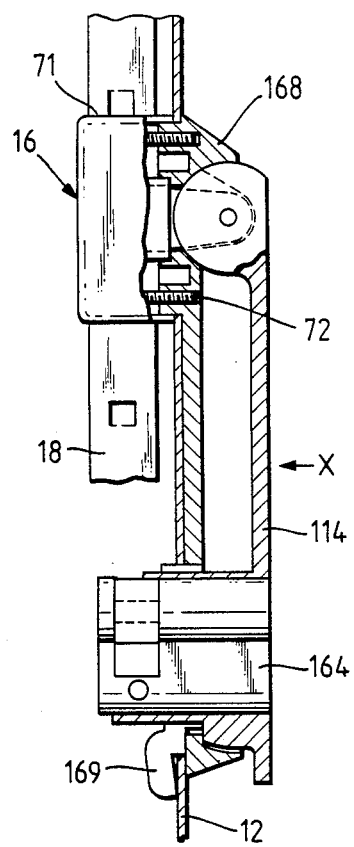
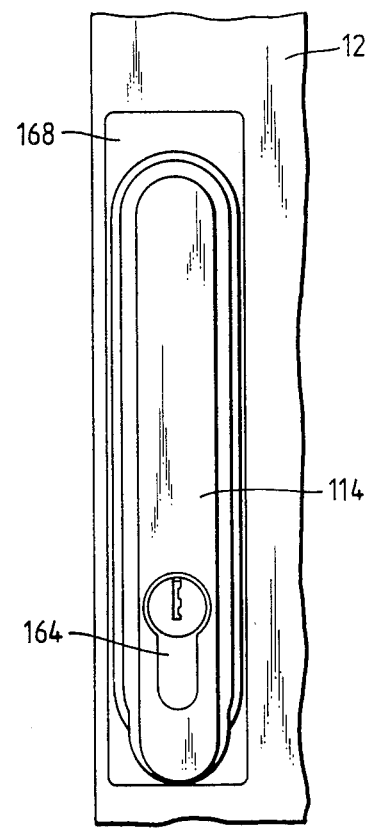
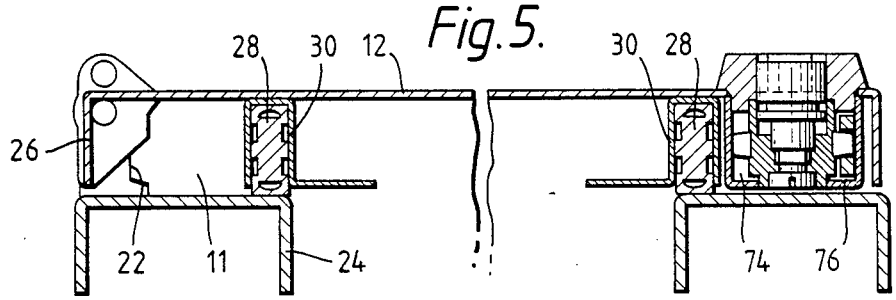
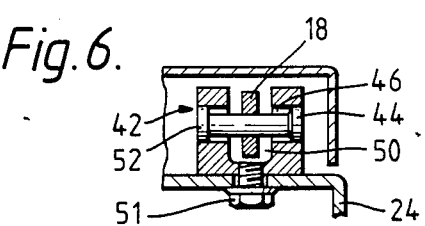
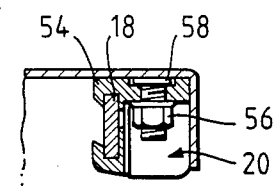

Fig. 3.
Fig. 4.
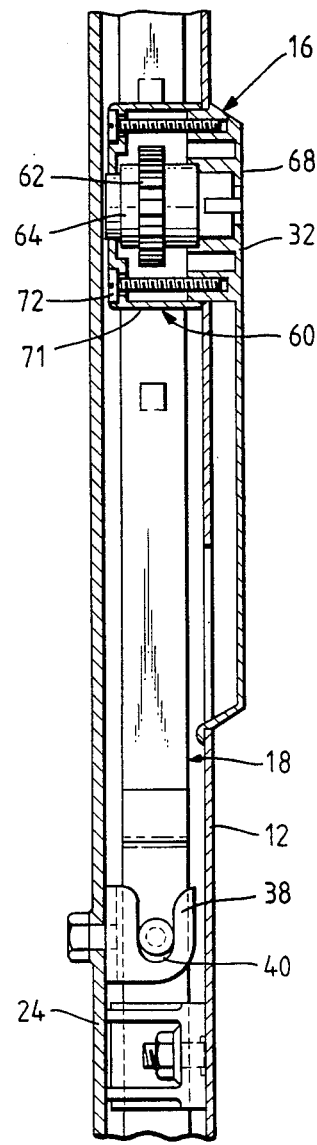
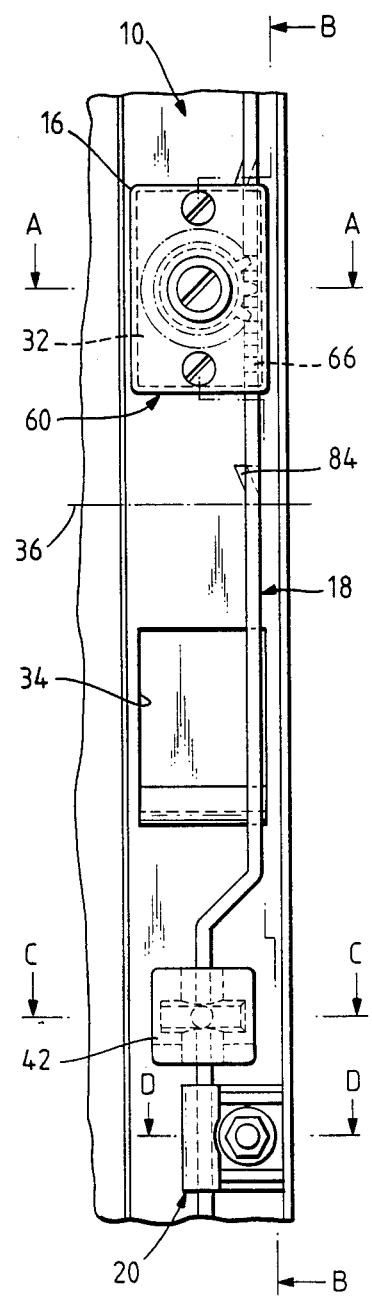

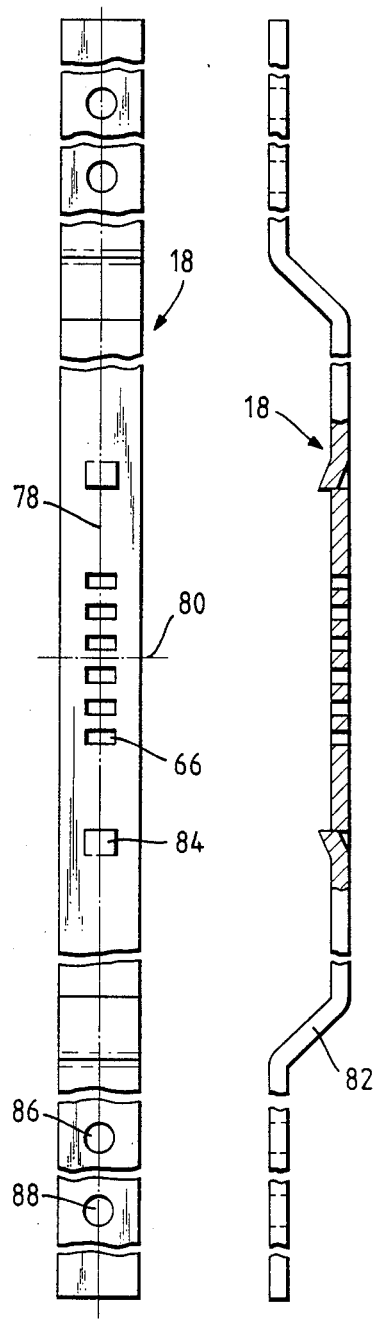
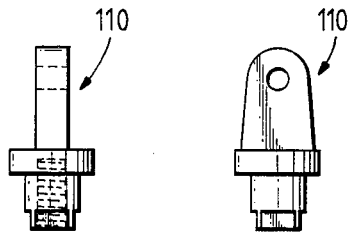
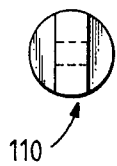
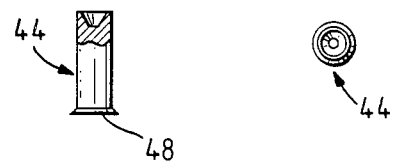

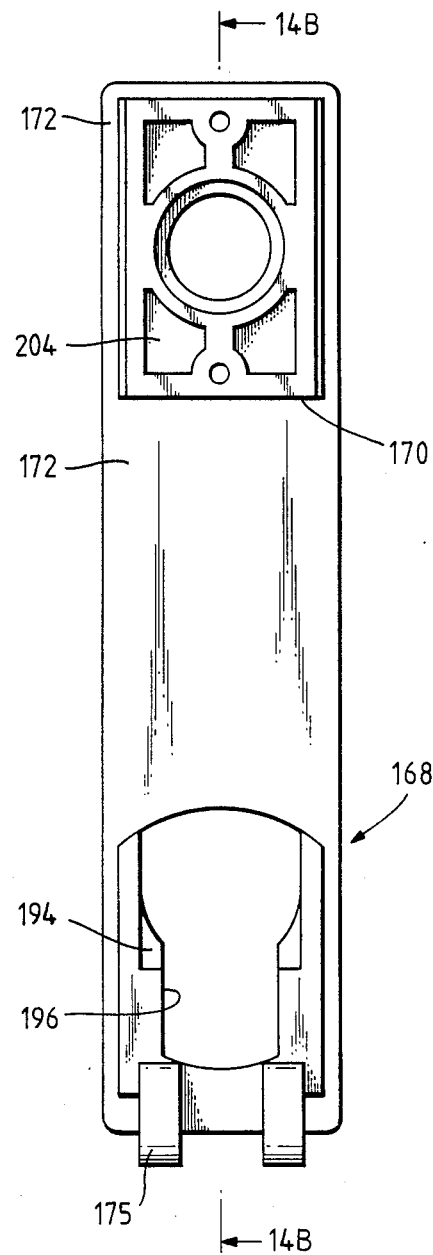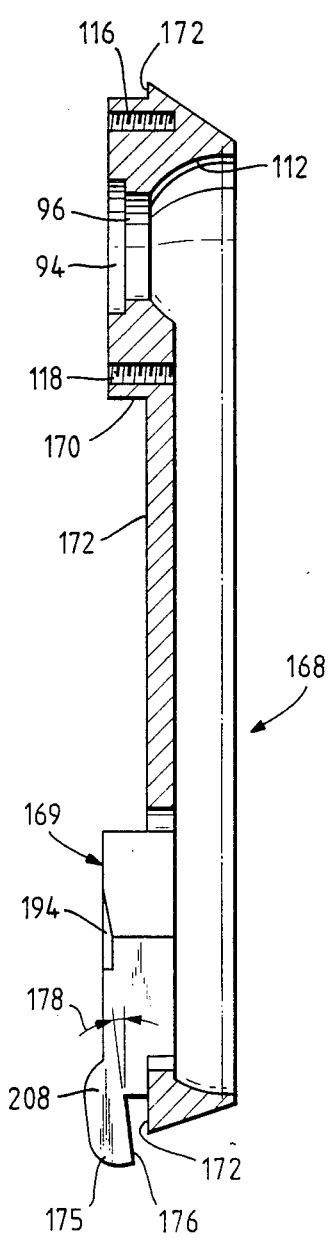
Fig. 14A.
Fig. 14B.

Fig. 14C.
Fig. 14D.
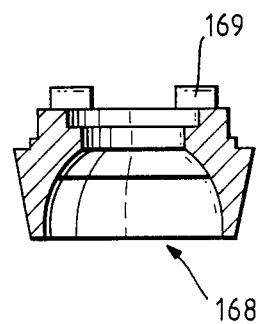
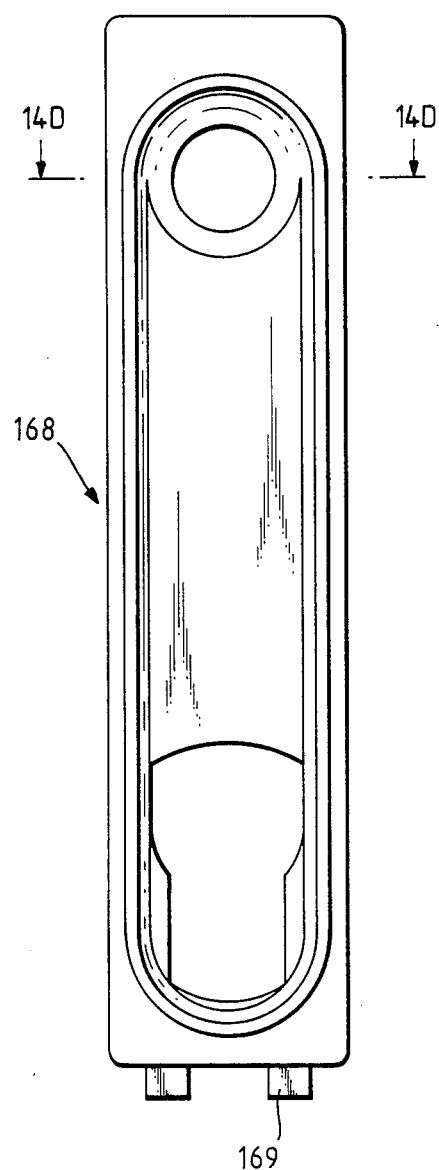
Fig. 15.
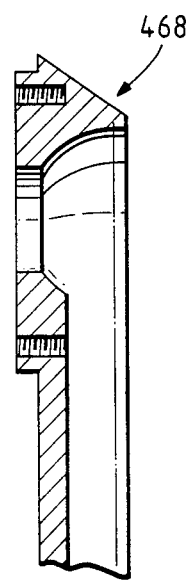

Fig.24A.    Fig.24B.    Fig.24C.
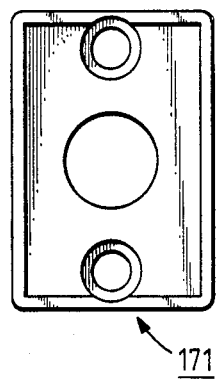 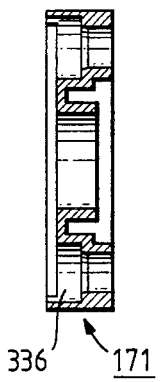 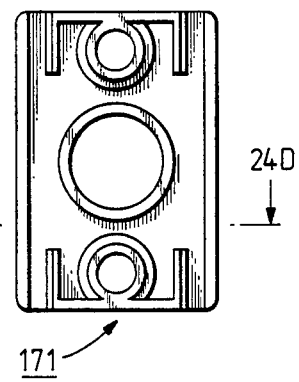
Fig.24D.
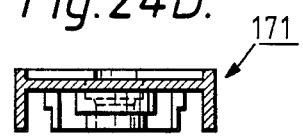
Fig.25A.    Fig.25B.    Fig.25C.
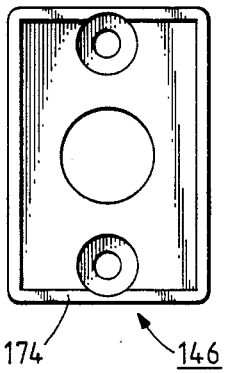 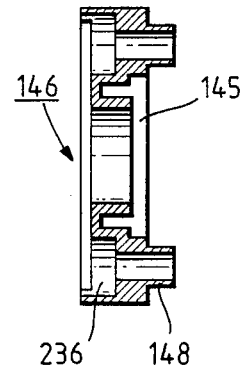 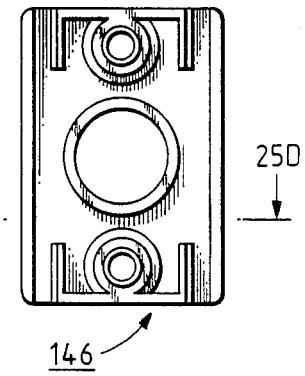
Fig.25D.
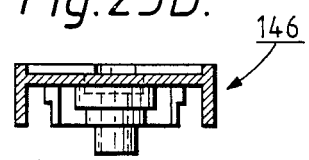

Fig. 30A.
Fig. 30B.
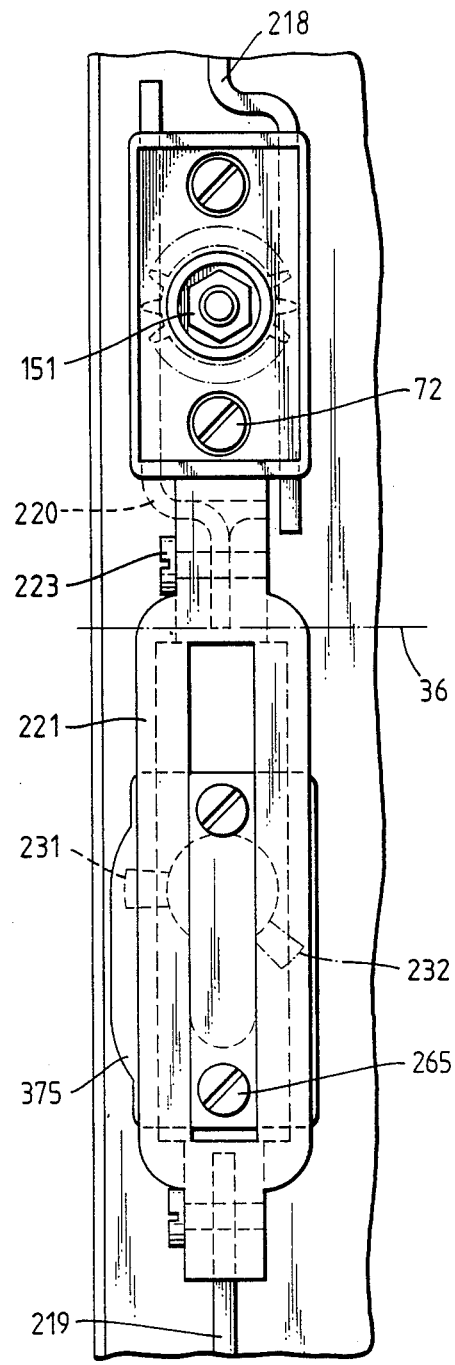
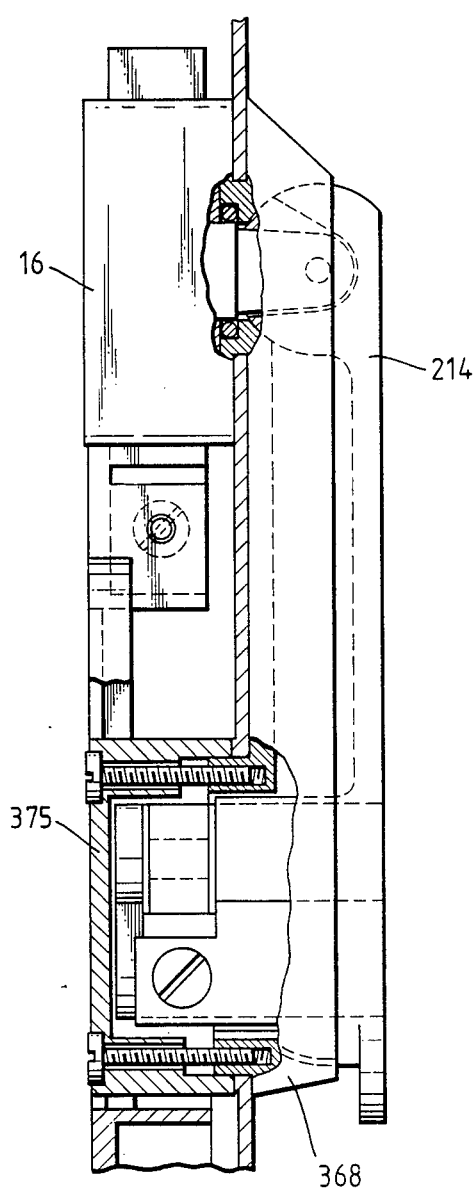

PIVOT LEVER BAR CLOSURE

BACKGROUND OF THE INVENTION

The invention relates to a swivel or pivot lever bar closure in the fillet gap of sheet metal cabinet doors.

A pivot lever bar closure of this nature is already known from the German patent application DE 34 07 700 A 1.

The advantage of this closure lies in that it occupies relatively little space and is so small that it can even be placed without difficulty in the narrow fillet gap of sheet metal cabinet doors. The advantage of placing it in the fillet gap is that otherwise dead space can be used and also that the inner clear space of a switch cabinet is fully available for other structural parts, in particular, switch devices. Since the fillet gap is outside the region of the switch cabinets that need to be sealed, sealing measures involving the closure itself can usually be dispensed with.

However, the known closure still had disadvantages. Apart from the two rectangular apertures of identical size, round apertures are required, through which the fastening screws can be led. This increases the expense of manufacturing the door panel, complicates installation of the closure and increases the overall length by the area holding the fastening screws. In addition, the arrangement of the cylinder lock within the base plate increases the overall length still further.

By arranging denticulations at both of the narrow sides of the side bars it is possible to use the closure for left as well as also for opening switch cabinet doors. However, when using preassembled locks, these bars cannot be simply changed. Instead, the pinion must be disassembled in a very cumbersome process from the lock case, the bars must be taken out, changed in the desired way, reinstalled, and then the pinion must again be installed. This problem occurs when a continuous slide bar is changed, because the bar cannot be slid into the guide channel of a preassembled lock case. If the locking devices arranged on the bar are formed by cuts into the bar, as in the known bar closure (see European patent application 85 111 937.0, published under the number 0176890), it becomes difficult to use the bars left as well as also right, because the bilateral cuts which would be required in the flat material bar could weaken the bars too much.

SUMMARY OF THE INVENTION

It is an object of the invention to improve the known pivot lever closure by decreasing the overall length so that no additional bores are required for fastening it in the door panel apart from the two rectangular apertures. Moreover, the construction should be such that the bar closure is applicable for left as well as for right-closing switch cabinet doors, with subsequent changes possible without tedious disassembling operations of the pinion, and without too much weakening of the bars which have flat strip material.

The drive of the flat bars should take place axially as much as possible in order to preclude undesirable tilting in the bar guides which would increase friction. Furthermore, the bar closure should consist of as few parts as possible, should run as smoothly as possible, and should permit ease of closure even if the locking devices must have a large run-up slope due to sealing devices provided between the door frame and the door panel.

This problem is solved in that the one shoulder is part of the lock case and that this shoulder, together with another part of the lock case, clamps the door panel in the region of the first rectangular aperture centering it. The other shoulder forms a hold for the cylinder lock arranged toward the end of the pivot lever. This other shoulder, together with a holding part which extends from it integrally in one piece or can be fastened to it by screws, clamps the door panel in the region of the second rectangular aperture centering it.

The pivot lever closure within the two rectangular openings is achieved without fastening means requiring additional apertures. In addition, the overall length is decreased and the manufacture of the door panel is simplified, since such additional apertures are not needed. Moreover, the installation of the closure is simplified. Future alterations are easily made should such a change become necessary when switch cabinets are moved. A great advantage of the construction according to the invention is that it can be fitted by a series of different lock constructions, which in each instance make use of the two rectangular apertures. These apertures are provided for the pivot lever closure, so that, if necessary, the pivot lever closure can also be exchanged for other closure devices without, as is the case with prior art for this purpose, utilizing additional holes that need to be covered, sealed or eliminated in some other way.

A further advantage of the construction according to the invention is that the driving pinion for the slide bars and the part of the closure representing a bearing for this pinion can take on a particularly favorable shape. It is possible to construct the one closure bar (or the two closure bars) with a lock nut and bar bearing guiding the bar(s) in the region of the lock symmetrically or double-symmetrically so that the bar closure can be used for right and for left closing doors without disassembling the pinion. The opening direction of rotation of the lock actuating device is freely selectable by respectively exchanging the bar(s) and/or turning the lock. In this way, the pivot lever closure has extraordinarily varied application, is especially simple to assemble and disassemble, and is inexpensive to produce because the bars are identical. Through the construction according to the invention, axisymmetrical application of force on the bars becomes possible, whereby tilting processes are avoided, which leads to smoother running of the closure. If, as will likewise still be described, so-called double roll pins are used on the bars, this ability to run smoothly is still more pronounced, and it becomes possible to accommodate a greater closing path as can occur with switch cabinet doors, which are provided with sealing devices between door panel and door frame. An additional advantage is that the closure consists of only a few individual parts, which adds to cost-reduction of manufacture and simplification of installation.

Damage to the lacquered door panel surface and subsequent rust formation is avoided if the shoulder forming a seat for the cylinder lock has a contact surface for the thumb of the cylinder lock because the thumb does not come in direct contact with the door panel.

The shoulder for the cylinder lock can have a one-piece undercut projection for simply "hooking" the base plate into the associated aperture during the installation process. Instead, one or two additional angle-, bow- or cap-shaped holding parts can be screwed onto it.

Moving is simplified if the lock case comprises a pinion for driving perforated or denticulated closure bars and a lock nut carrying the pinion and rotatably supported in a lock nut and bar bearing. The bars consist of flat strip material and are supported and axially displaceable in the lock case. The bar bearing is rotatable by an actuating shaft extending to the outside through the first aperture and carrying the pivot lever. The lock nut and bar bearing of the lock of the pivot lever bar closure has a base part formed by the base plate, which supports the one end of the lock nut as well as a cap part which can be placed onto the base part and can be connected to it with screws or the like. The base plate supports the other end of the lock nut and if need be forms together with the base part four guide slits for the bar(s).

The cap part preferably has in the cap bottom a central opening for the bearing of the lock nut and one lug arranged above and below the central opening and projecting into the cap interior with a sunk bore for receiving a fastening screw. In this manner, the cap part can be readily disassembled for the purpose of exchanging the bar, but also for exchanging the kind of actuating device.

If the lock nut and bar bearing consists of a base part and a cap part of substantially identical structure, further production simplifications and cost savings result.

If the base part and cap part have reciprocal guides installation is simplified.

According to the invention, the base part, which is part of a pivot lever closure, can be replaced by a part of a hand lever closure. Therefore, the closure can be replaced by another closure, and can be brought back to the old state with only a single part of the entire closure needing to be exchanged. Such possibility is not offered by the prior art.

DESCRIPTION OF THE DRAWINGS

Below, the invention is explained in greater detail in conjunction with embodiments, which are shown in the drawings, in which:

FIG. 1 shows in an axial sectional view, which corresponds to a section along line B—B of a yet to be listed FIG. 2, a model of the pivot lever closure according to the invention;

FIG. 2 shows a elevational front view of this closure in the direction of arrow X of FIG. 1;

FIG. 3 shows an axial section view similar to FIG. 1, but with the pivot lever device replaced by a socket wrench device and the rectangular aperture closed by a cover plate with the remaining parts being unchanged. As shown, the pivot lever closure is compatible with other types of closures;

FIG. 4 shows a view from behind a sheet metal door into its fillet gap with a closure, as shown in FIG. 3, installed into this fillet gap to illustrate the arrangement of the bars with associated guide and closure devices;

FIG. 5 shows a sectional view along line A—A of FIG. 4 for further illustration of the bar arrangement as well as the door panel construction, for which the pivot lever closure according to the invention is particularly well suited;

FIG. 6 shows a sectional view across section line C—C of FIG. 4 to explain a suitable locking device with double roll pin arrangement;

FIG. 7 shows a sectional view cross section line D—D of FIG. 4 to explain a suitable bar guide;

FIG. 10 shows a plan view of a double-symmetrical closure bar;

FIG. 11 shows an elevational view of the bar of FIG. 20;

FIG. 12 shows an elevational view of the bar of the FIG. 11, however, with one end cut off;

FIG. 14 A-D show four different views of the base part of the pivot lever closure shown in FIG. 1 according to a first embodiment of the invention in which FIG. 14A is an elevational front view, FIG. 14B is a sectional view taken across section lines 14B—14B of FIG. 14A, FIG. 14C is an elevational back view, FIG. 14D is a sectional view taken across section lines 14D—14D of FIG. 14C;

FIG. 15 a partial sectional view similar to FIG. 14D of a modified model of the base part;

FIG. 19 A, B, C show front, right side, an bottom views, respectively, of the pinion inset used in the pivot lever closure according to FIG. 1 and fitting into the base part according to FIG. 14 for articulating the pivot lever;

FIGS. 22 A-D show respectively axial sectional and bottom views of each of the two structural parts required for the arrangement of the double roll pins on the actuating bars;

FIGS. 24 A-D shows respectively front, elevational sectional, rear and sectional views of the cap part of the closure according to FIG. 23, the latter sectional view being taken across section lines 24D—24D of FIG. 24C;

FIGS. 25 A-D show respectively front, elevational sectional, rear and sectional views of the inner base part of the closure according to FIG. 23, the latter sectional view being taken across sectional lines 25D—25D of FIG. 25C;

DESCRIPTION OF THE PREFERRED EMBODIMENT

Figure 8:
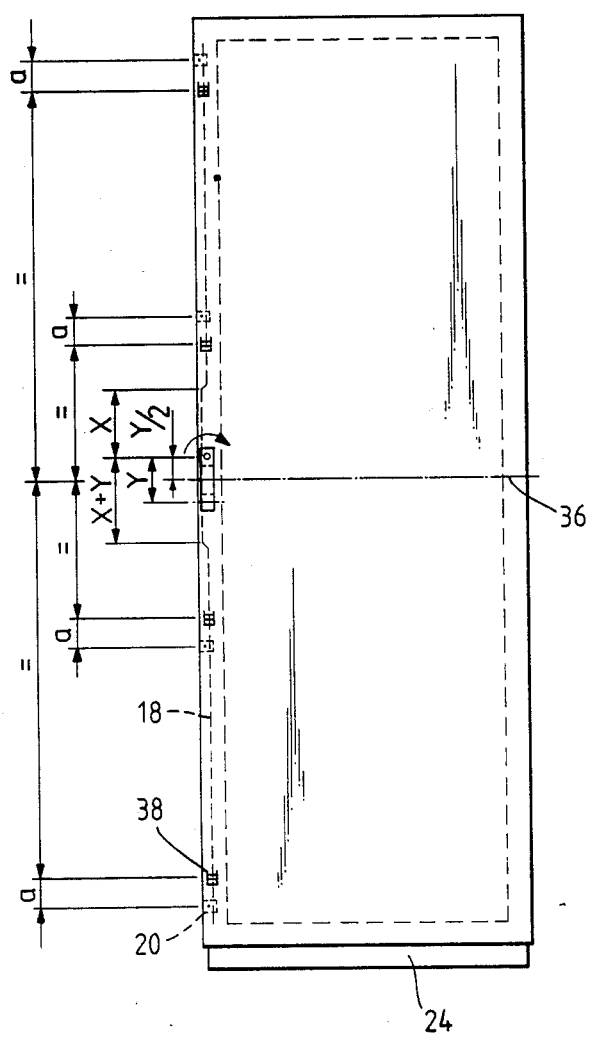
FIG. 8 shows a plan view from the outside of a door with installed bar closure, in which the actuating device is to be operated clockwise.
Figure 9:
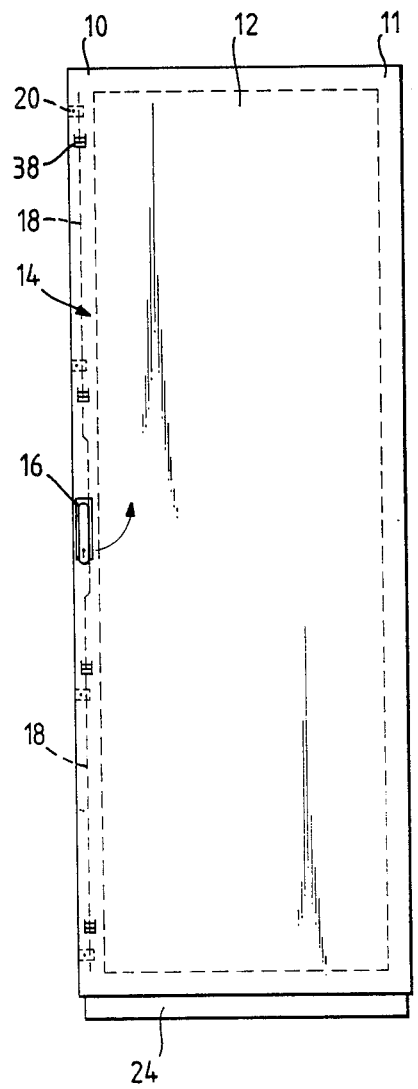
FIG. 9 shows a plan view corresponding to FIG. 8 except that with pivot lever actuation, the closure bar is arranged correspondingly different and shown in dashed lines.

FIG. 4 will be discussed first. FIG. 4 shows a view of fillet gap 10 of a sheet metal door 12. A bar closure 14 is arranged in this space consisting of a lock 16, from which a bar 18 extends in this fillet gap 10. The bar 18 is supported within the lock 16, and is also displacably supported in a bar guideway 20 on the door panel 12.

The sheet metal door 12 is articulated on the body of the cabinet 24 with joint hinges 22 which utilize the other fillet gap 11 formed between the outer bent 26 and a section sheet 30 welded onto the door panel and holding a sealing 28 or by a bent 230 of the body of the cabinet 24 (see FIG. 29) resting against a sealing 228. Customarily, in sheet metal cabinets fillet gaps 10, 11 of this nature, a rectangular aperture 32 or 34 is arranged in the fillet gap for the closure; if sinkable pivot lever closures are intended to be used, two such rectangular apertures 32 and 34 are arranged symmetrically to the horizontal door center 36.

As is apparent in FIG. 3 (an axial sectional view along line B—B of FIG. 4) a hook-like projection 38 is screwed to the body of the cabinet 24. When the bar closure is closed, a double roll pin 40 supported by the closure bar 18 penetrates the cabinet body and forms a locking assembly 42. The sectional view C—C of this locking (see FIG. 6) shows that the bar 18, which is formed of flat strip material, carries a peg 44 in press fit (see also FIG. 22 and FIG. 29). The peg carries rollers 46 on both sides. The rollers can readily be rotated but cannot slide off the pin 44; this is due to the presence of a head 48 on the one side of the peg 44, and a flange (beading) 52, which is created on the opposing side of the peg after the peg and rollers have been assembled.

The hook 38 is provided with a slit 50 for receiving the bar 18. The section C—C of FIG. 6 shows that the hook is U-shaped and that the web of the U has a threaded bore that a set screw 51 can be screwed into to fix the hook. The hook can also have a safeguard against rotation, formed by a prismatic aperture in the body of the cabinet 24, into which can be lowered corresponding projections of the hook.

One possibility for guiding the bar is represented in section D—D of FIG. 4 (see FIG. 7). The bar guideway 20 is arranged with a stud bolt arrangement found in the corner of the fillet gap 10 and safeguarded against rotation. It is formed so that the flat strip bar 18 slides into the guide after a projection 54 has previously been bent away, whereupon the fastening nut 56 of the welding bolt 58 can be tightened. The bolt presses the projection 54 against the bar 18 forming the safeguard.

FIG. 3 shows that the lock 16 comprises a lock nut and bar bearing 60, which rotatably holds a lock nut 64 carrying a pinion 62. The lock nut 64 can be rotated with an actuating device brought to the outside through the door panel 12, a pivot lever is used (see FIG. 1) but also a socket wrench (see FIG. 3) or the like can be used with the pinion. The pinion engages corresponding perforations or denticulations 66 of the bar 18, moving the bar up and down.

The lock nut and bar bearing 60 consists of a base part 68 (see FIG. 3) and a base part 168 (see FIG. 1, also FIG. 27, 29, 15 show further embodiments 268, 368 and 468) on which base part end of the lock nut 64 rests and a cap part 71 which can be placed on the base part 68 or 168. The cap part is secured with screws 72 on the base part and supports the other end of the nut. As seen in FIG. 5, the lock nut and bar bearing 60 forms guide slits 74 and 76 for insertion of the bar 18 either in the manner shown, in which the closing direction is clockwise, or into channel 74, in which a reverse closing direction is obtained for the actuating device.

In order to permit this turning of bar 18 and, in this manner, bring about a change in the direction of rotation with respect to the actuating device without needing to undertake other changes, the bar 18 (see also FIG. 10 and 11) is double axisymmetrical around the longitudinal axis 78 and the transverse axis 80. The symmetry includes punched-out stopping lugs 84 and the flange 82. The lugs rest on the outer surface of lock 16 and thereby limit the travelling path of the bar. The flange (beading 82) forms the free space for the arrangement of the pinion 62. Also included in the symmetry are bores 86, 88, which are provided for arranging the already described double roll pins 40.

Figure 13A:
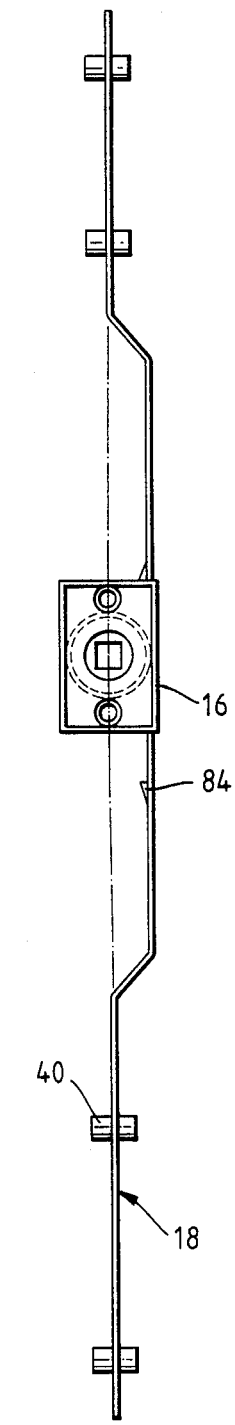
FIG. 13 A-C respectively show left, front and right elevational views of the bar according to FIG. 10 and 11 with double roll pins installed as a locking organ and installed in the actuating lock, once for left operation and once for right operation.
Figure 13B:
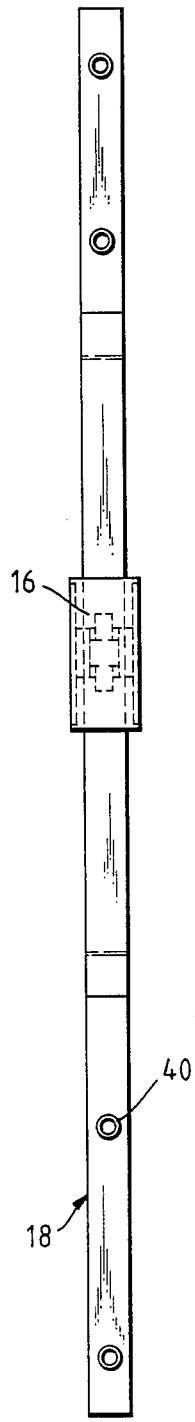
Figure 13C:
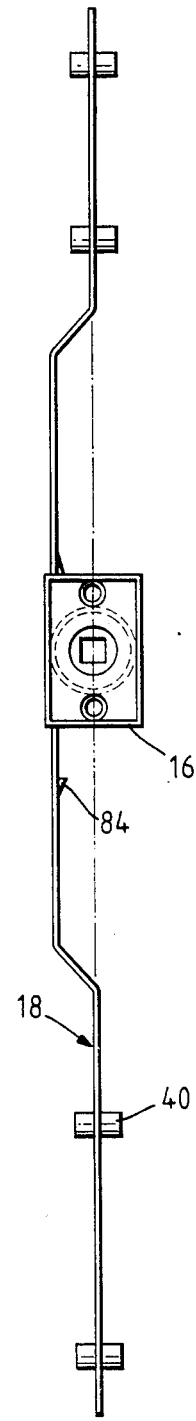

In FIG. 13 the two described arrangements of bar 18 are shown, with the installed double roll pins 42 also being visible. FIGS. 21, 30A–C, and 31A–C show other forms of the bar.

The base part 168 of the pivot lever closure according to FIG. 1 is represented in FIGS. 14A–D respectively in a plan, an axial section view, a view from behind, and a cross sectional view. This base part 168 represents the base plate of the pivot lever closure according to a first model. The base plate 168 shown in FIGS. 14A–D has a shoulder 169 reaching through one of the rectangular apertures 34, for example, which rests against the lower edge of this opening reaching behind it with an integrally attached holding part 175. The shoulder 169 and a part of the lock case 16 projecting at the other end of the base plate 168 forming shoulder 170 penetrate the two apertures 32, 34 and contact regions of the apertures 32, 34 creating centering. This fixes the base plate within the door panel 12 in the direction parallel to the door panel.

The base plate 168 and the entire pivot lever closure at the end having the pivot lever shaft are fixed in the direction perpendicular to the door panel by screwing on the cap part 71 so that the door panel 12 is clamped between the contact surface 172 of the base plate and the peripheral edge 174 of the cap part 71. At the other end of the base plate 168, clamping takes place between surface 172 and the point region 176 of the two holding parts 175. The undercut of the holding parts 175 forming this point region 176 proceeds obliquely at angle 178, which approximately corresponds to the angle at which the base plate 168 must be held during the process of sliding in due to shoulder 170 for the other apertures.

During pivoting and inserting of shoulder 170, the point region 176 is in firm contact with the door panel sheet metal and clamps the base plate 168 firmly to the door panel 12. The shape of the base plate 168 is so selected that the apertures 32, 34 are completely covered so that placing a sealing leaf in between the outer surface of the base plate and the corresponding outer surface of the door panel becomes possible.

Figure 17A:
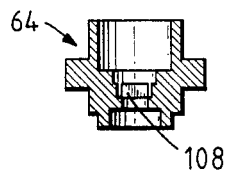
FIG. 17 A, B show an axial sectional view and a bottom view, respectively, of the pinion of the pivot lever closure used according to FIG. 1 and belonging to the base part according to FIG. 14.
Figure 17B:
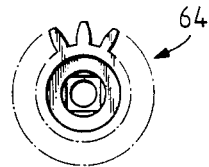
Figure 18A:
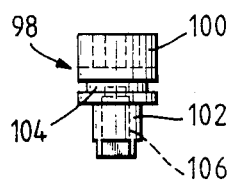
FIG. 18 A, B show an axial sectional view and a bottom view, respectively, of a socket wrench inset insertable into the pinion according to FIG. 17 to arrive at the model according to FIG. 3.
Figure 18B:
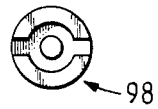
Figure 20A:
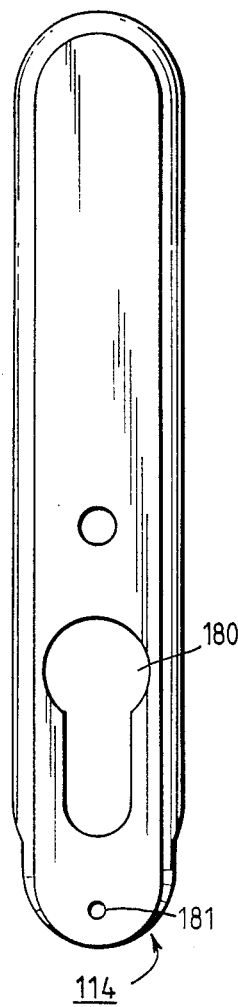
FIG. 20 A-D respectively show an elevational view, an axial sectional view, an elevational back view, and a sectional view taken across section line 20D—20D of FIG. 20B for a corresponding fitting pivot lever.
Figure 20B:
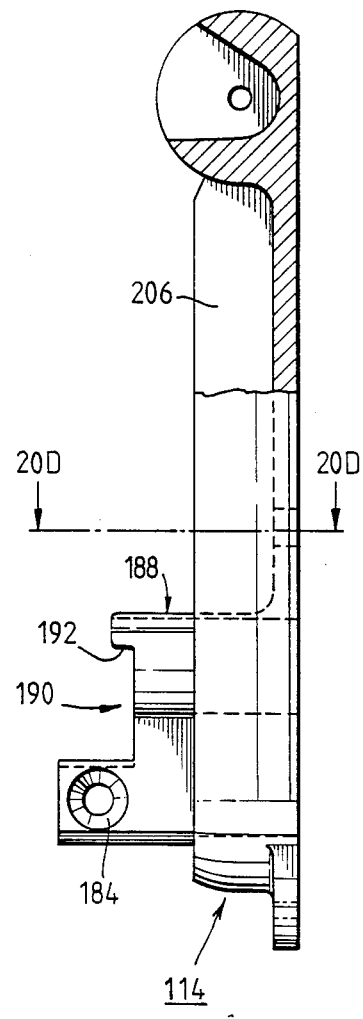
Figure 20C:
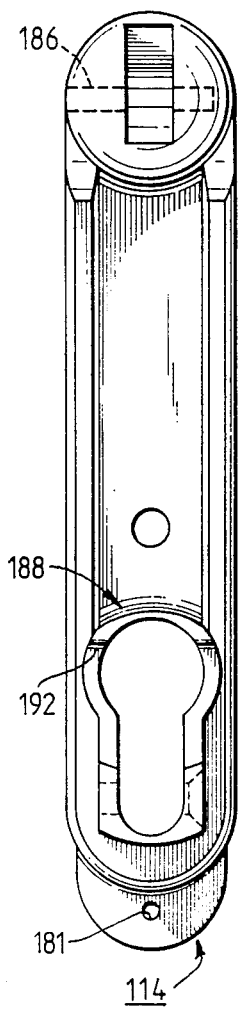
Figure 20D:
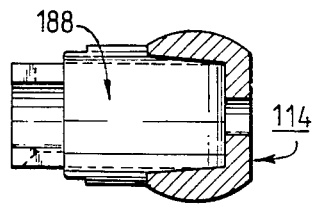

A circular sunken area 94 functions as a bearing for lock nut 64, while an aperture 96 of smaller diameter serves to seat the inset 110 (see FIGS. 19A–C) supporting the pivot lever 114. Alternatively, a double bit key inset 98 (see FIGS. 18A,B) can also be held with its head 100 in pinion 64, which is shown in FIG. 17, the double bit key inset 98, an additional part of this head (which also has a peripheral groove 104 for holding an 0-ring sealing) and a foot part 102 can be supported torsion-proof in pinion 64 and be screwed in with a screw, which can be screwed into a threaded pocket hole 106. This permits torsion-proof connection between these two structural parts 64 and 98 with a square plug connection. The advantage of this multi-part construction is that the inset can be exchanged depending on need, so that the pinion 64 can be used for entirely different kinds of keys. For the pivot lever closure the already mentioned pivot lever inset 110 functions which can subsequently be set into the base part 168 with the associated pinion 64. The base part 168 has a spherical surface 112 to support the pivot lever 114 according to FIGS. 20A–D aside from the sunken area 94 and the bearing surface 96.

The base part 168 is customarily injection molded of synthetic material and, in this case, has injected pocket bores 116 or penetration bores 118, into which the set screws 72 create their own threads in the process. If the parts are injection molded of metal, the appropriate threaded pocket holes or penetration holes will have to be provided.

Also the pivot lever 114 shown in FIGS. 20A–D is usefully injection molded of synthetic material in order to achieve an additional insulating effect against voltage displacement from the interior of the switch cabinet to the outside.

It is advisable that the bar guideway 20 be injection molded of synthetic material. The hook 38 is more frequently made of metal due to greater load requirements. The synthetic material permits substantially wear free friction bearing wear and when subjected to low frictional forces pin locking is free of tilting forces due to the double roll and therefore ensures a smooth-running turnable locking mechanism. Only very few parts are required for the hinges. By designing the hook 38 in such a way that it has great slope, even doors with thick sealings 28, 228 can be closed reliably.

If only a single bar 18 is used, all hooks 38 are oriented in one direction, while when two bars are used for actuation in opposite directions, causing a reduced load on the door hinges, the hooks for the one bar have a different orientation than the hooks for the other bar. The advantage of this double bar arrangement is that the frictional forces obtained when the door is actuated cancel each other on the door panel and, consequently, no forces need to be transmitted from the door panel to the door frame. These frictional forces are relatively small when double roll pins are used as is provided here, so that the use of even only one actuating bar is possible without difficulties.

Figure 16A:
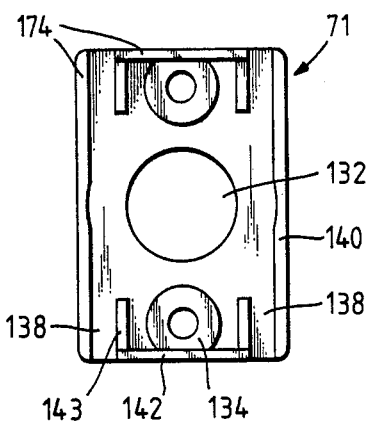
FIG. 16 A-D show four different views of the cap part belonging to the base part of FIG. 14 corresponding to the views of FIGS. 14A-14D, respectively.
Figure 16B:
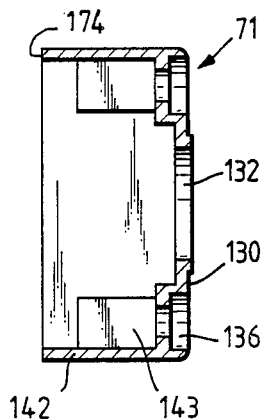
Figure 16C:
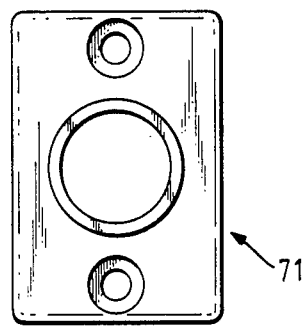
Figure 16D:
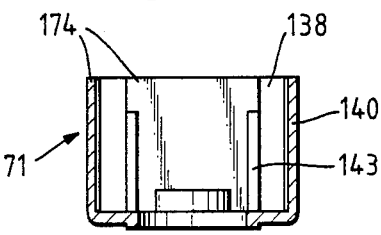

The cap part 71 shown in FIGS. 16A–C will now be discussed in greater detail, which can be slipped on after insertion of base part 168 into the apertures 32, 34 of the door panel 12 and after insertion of the selected pinion 64, bearing 110, and pivot lever 114, as well as after appropriate attachment of associated actuating bars 1 8. The cap part 71 shown in FIGS. 16A–C has a central opening 132 in the cap bottom 130 for bearing the lock nut and one lug 134 each arranged above and below the central opening 132 and projecting into the interior of the cap with a sunk bore 136 for receiving the set screw 72. From the cap bottom 130 two longer side walls 140 extend parallel to the guide slits 138 as well as shorter side walls 142 perpendicular to them. The shorter walls adjoin the lug 134 and have guiding walls 143 extending from them. These guiding walls 143 project into the interior of the cap and are arranged at a distance and parallel to the longer side wall 140 and form a part of the guide slit 138. This cap part 71 fits onto the described base part 168, with the wall 143 reaching nearly to the inner front face of the base part 168 or 68 according to FIG. 3. The pressure exerted by the set screws 72 is transmitted from the front faces of the side walls 142, 140 onto the edge region of the door panel aperture 32 (according to FIG. 4) and holds the closure safely in the door panel, as already explained.

In FIG. 15 a somewhat modified embodiment of the particular base part can be recognized, here labeled 468. This differs from the previously described models because it is modified in so far as the part reaching into the door panel is shortened so that the sunken area 94, which previously has served for bearing the nut, is omitted. This modified base part 468 is provided for a pivot lever closure which is explained in greater detail in FIGS. 23A–C. In this embodiment, the base part is of two parts consisting of a base plate part 468 and a bearing part 146. The bearing part 146 is of substantially identical structure as the associated cap part 71, as is evident in FIGS. 24A–D, which show the cap part 70, and FIGS. 25A–D, which are a representation of the bearing part 146. The two parts differ solely in that the bearing part 146, from the edges of the sunk bores 236 to the connecting plane 145 for the two parts 146, 71, projecting lugs or annual projections 148 extend in the direction of the other part, which fittingly engage the opposing part. Setoffs arranged in the cap part 71 correspondingly enlarge sunk bores 336, and effect reciprocal locking of the two parts. It is, however, also possible to lead tubular rivets through the sunk bores 236, 336 to cause reciprocal locking of the parts, whereupon these two parts can be identically built. By using tubular rivets, preassembly of the lock nut and bar bearing would become possible in the manufacturing plant.

The additional advantage would be that the preassembled lock nut and bar bearing could be combined with varied other key catches forming the remaining part of the base part of the like instead of with the shown pivot lever base part 468. Because the two parts forming the lock nut and bar bearing are identical, the cost of production and maintaining stock supplies is reduced for a lock series. This resulting modular construction extraordinarily varied application possibilities.

Figure 26:
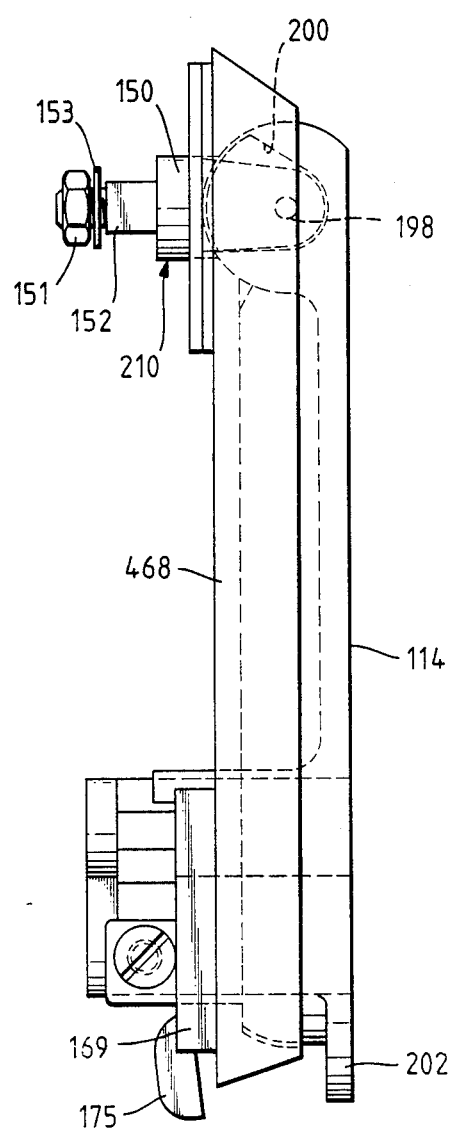
FIG. 26 shows an elevational view of a pivot lever put together from the individual parts of FIG. 15, 20 and 23.
Figure 23A:
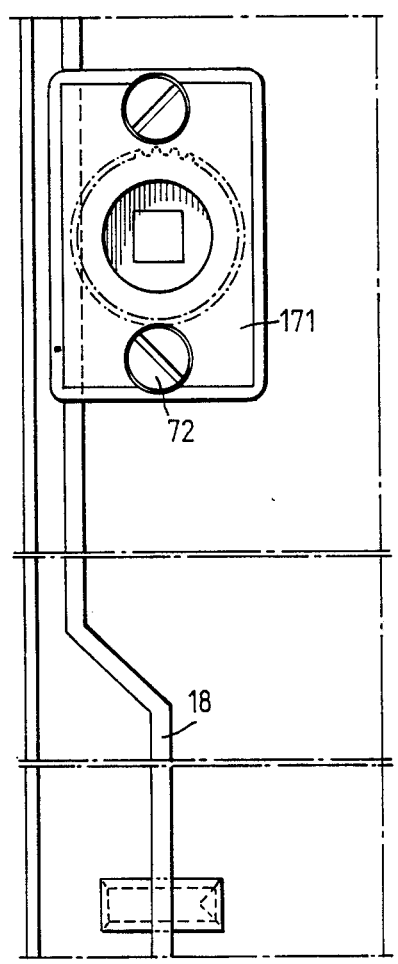
FIGS. 23 A-C show respectively a right elevational view, an axial elevational sectional view of FIG. 23A, and a top sectional view of FIG. 23A of a further embodiment of the pivot lever bar closure according to the invention with an even more pronounced symmetrized lock nut and bar bearing device.
Figure 23B:
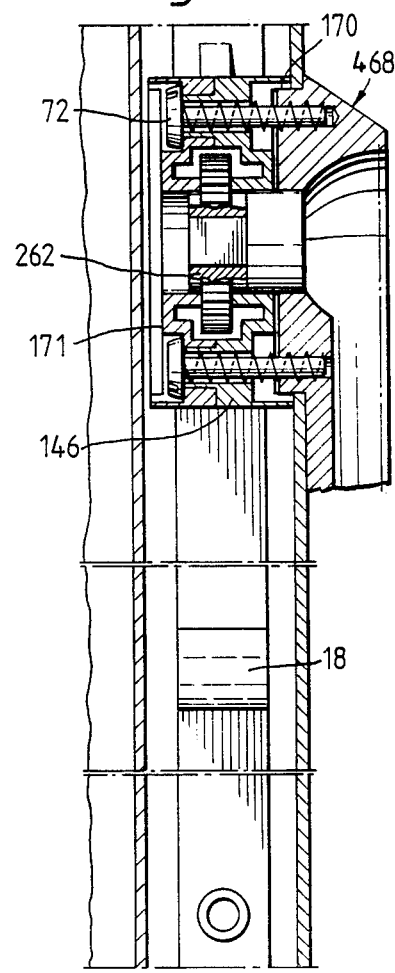
Figure 23C:
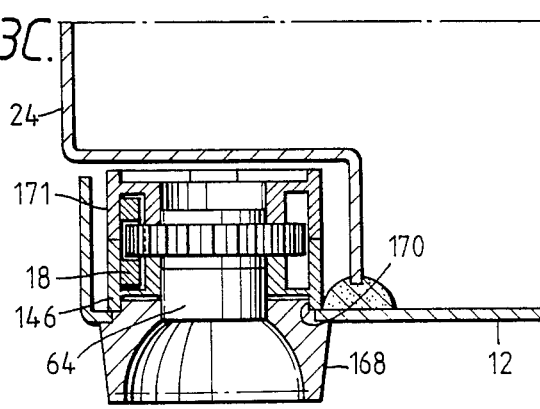
Figure 27A:
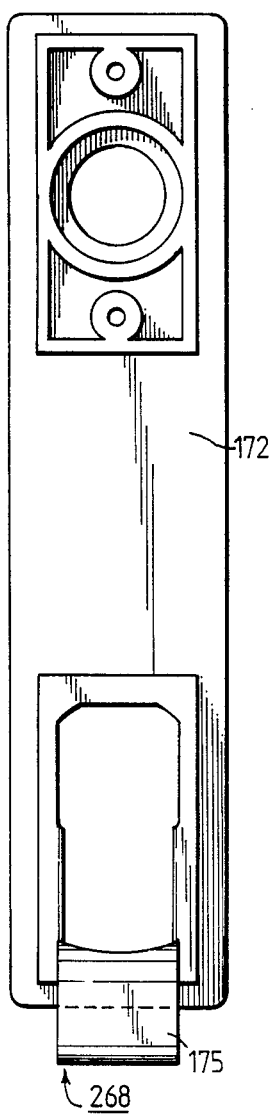
FIGS. 27 A-D show respectively front, axial elevational sectional, rear and sectional views in a similar representation as FIG. 14 the base part for another narrower model of the pivot lever closure according to the invention the latter sectional view taken across section lines 27D—27D of FIG. 27C.
Figure 27B:
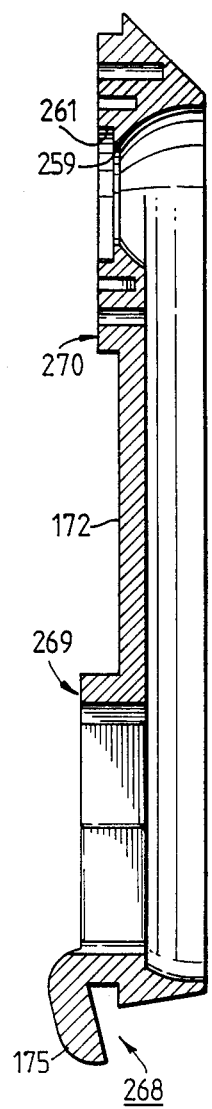
Figure 27C:
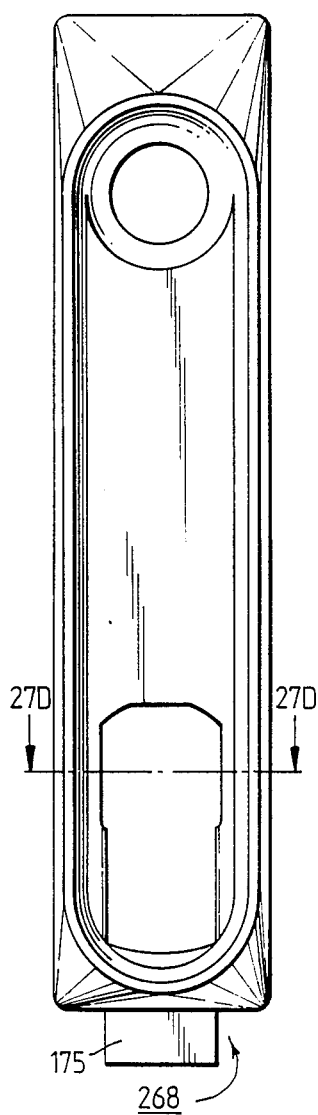
Figure 27D:
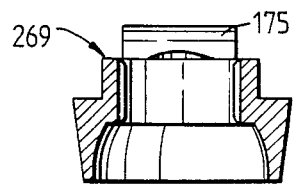
Figure 28C:
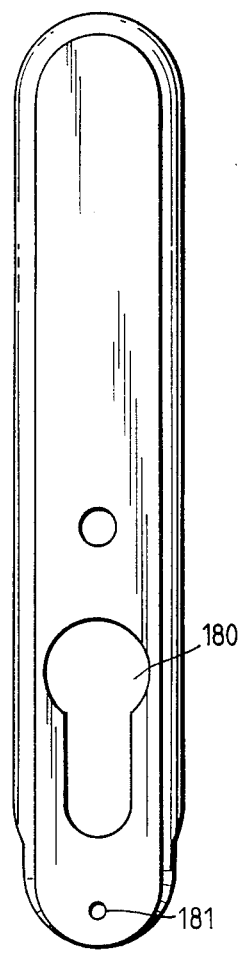
FIG. 28 A-D show front, axial elevational sectional, rear and sectional views in a similar representation as FIG. 20 a pivot lever fitting the base part of FIG. 27, the latter sectional view being taken across section lines 28D—28D of FIG. 28B.
Figure 28B:
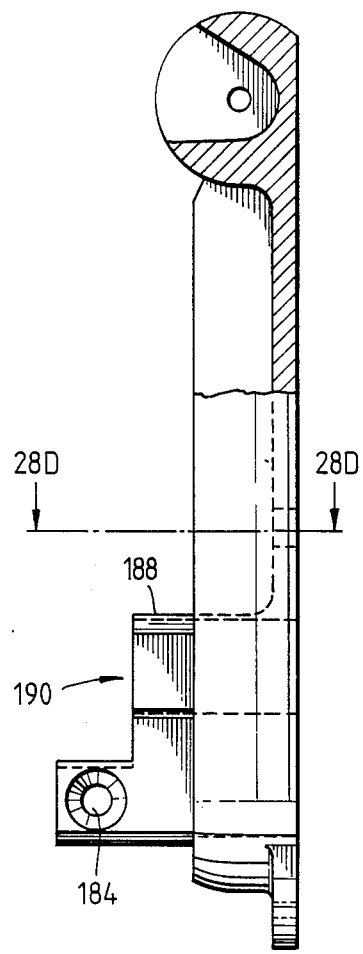
Figure 28A:
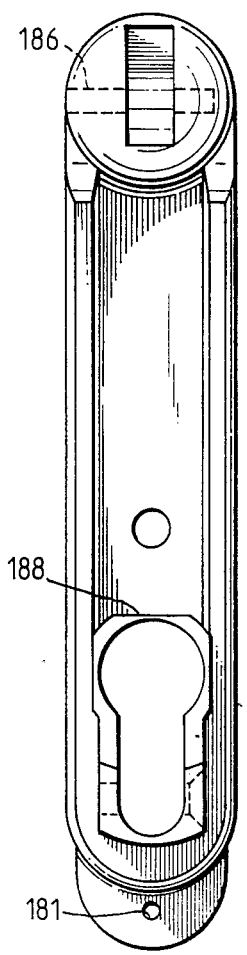
Figure 28D:
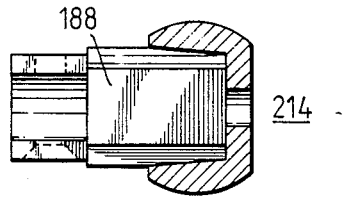
Figure 29A:
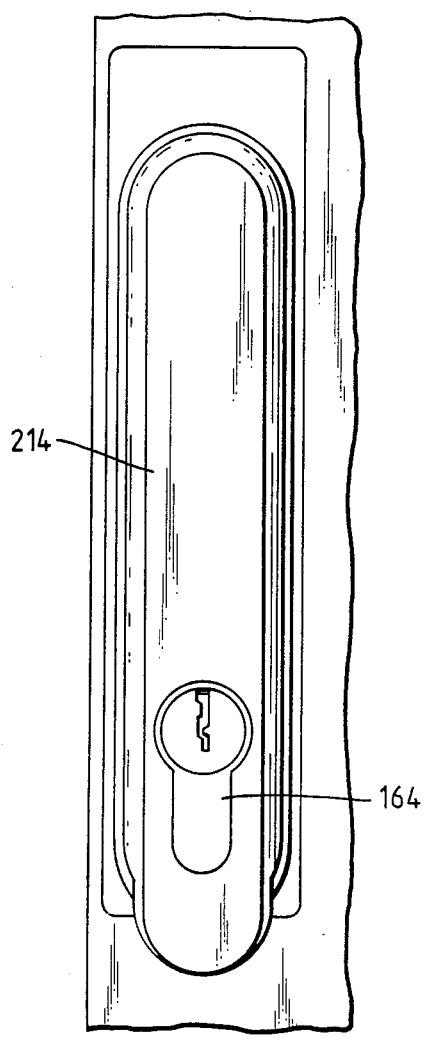
FIG. 29 A-D show respectively front, axial elevational sectional, right plan and sectional views of a bar closure using the parts of FIG. 27 and 28 with angle fastening and a continuous bar.
Figure 29B:
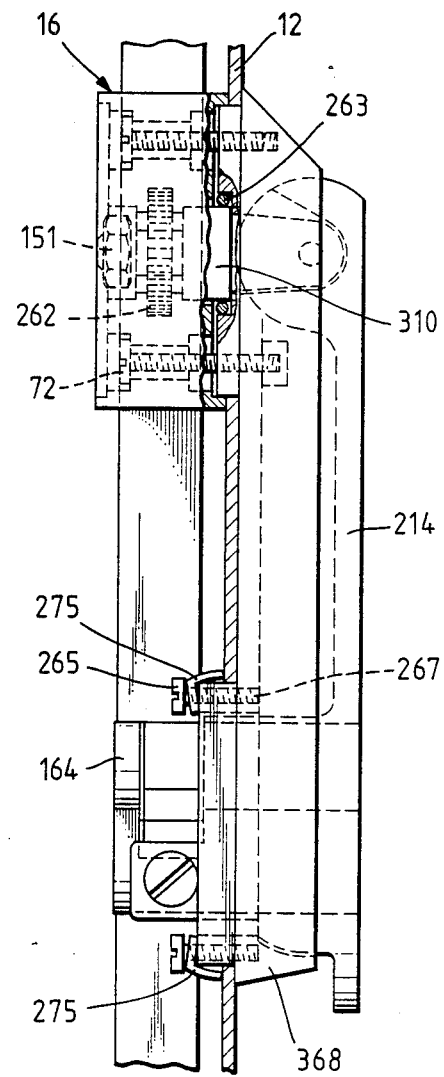
Figure 29C:
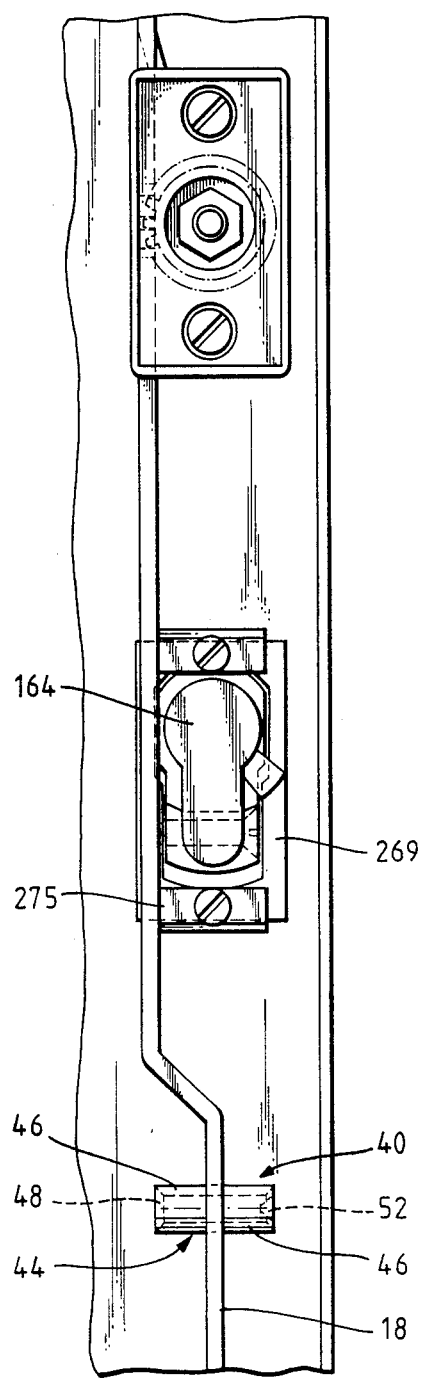
Figure 29D:
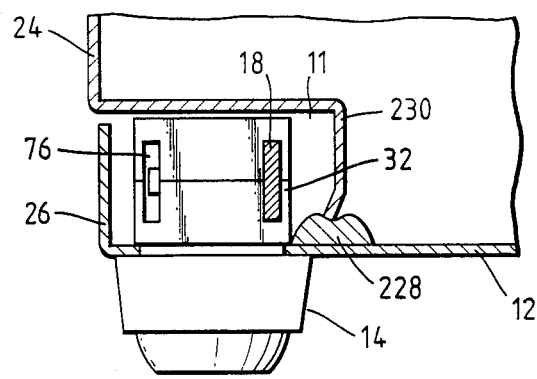

In the embodiment according to FIGS. 23A–C, a slightly modified inset 210 should be provided instead of inset 110 of FIG. 19A–C. The inset 210 has an enlarged bearing part 150 (see FIG. 26) adapted to the diameter of the bore of the base part 146. In FIG. 26, a square 152 extending from the bearing part 150 is shown for plugging into the corresponding square opening 154 of the associated pinion 262. The pivot bearing 210 is secured with a bolt extending from the square 152, onto which a screw can be placed (see FIG. 26).

Figure 21:
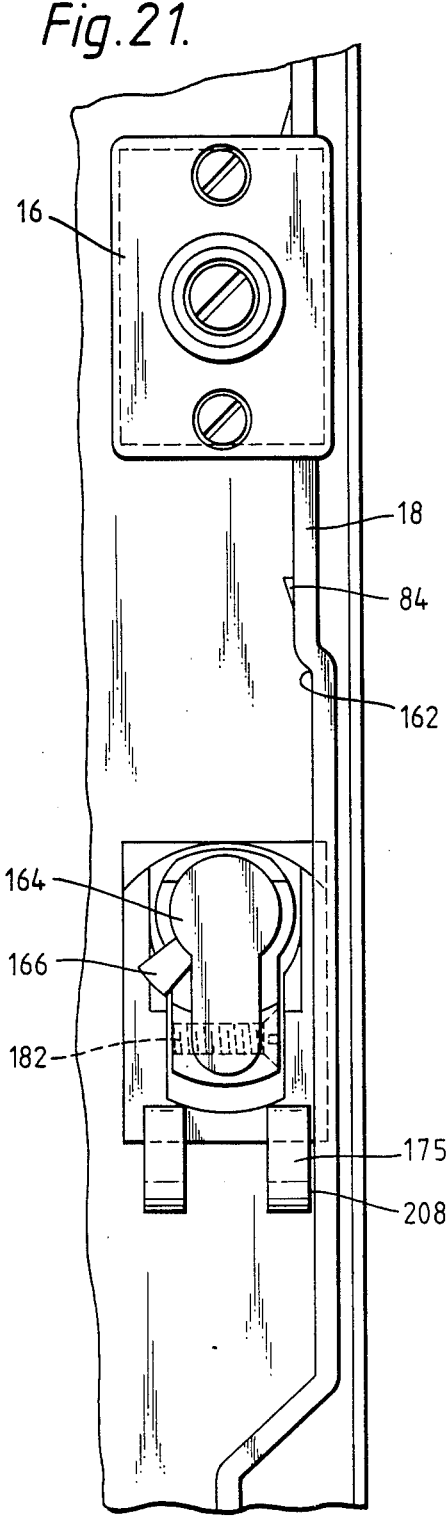
FIG. 21 shows an elevational view from behind the installed pivot lever closure according to FIG. 1 for representing an additional right angle-bent of the actuating bar in this application case, with the two rectangular apertures again being shown separately.

A commercially available cylinder lock 164 can be slid into the pivot lever, see FIG. 1 and FIG. 21, into a corresponding opening 180 and secured with a screw 182. The screw can be set into a correspondingly sunk bore 184 in the handle 114. The pivot lever 114 can be articulated with a peg. The peg can be pressed into a bore 186, to the pivot bearing part 210 or 110. The pivot lever has at its free end a projection 188, which essentially surrounds the cylinder lock and holds it tight but leaves the range of motion of the thumb 166 of the cylinder lock free (see region 190). The recess is bilateral in order to bring out the thumb 166 optionally left or right for right/left use of the closure. The thumb motion is limited by the stopping surface 192.

Locking takes place in that after penetration of projection 188 of the lever 114 into the correspondingly formed opening 196 of the base plate 168, the thumb 166, upon being swung open, reaches behind a run-up surface 194 and engages it, forming the locking.

The base plate shown in FIGS. 14A–D is formed like a trough in order to take up approximately one half of the lever 114 and to prevent parts from projecting too far from hindering possible escape routes which is a disadvantage in switch cabinets.

The pivot lever has a contact surface 200 with respect to its swing-out axis 598. This surface limits the swing-out motion of the lever 114 in that it lies against the pivot bearing 210. A projection 202 provided at the free end of lever 114 facilitates grabbing the lever 114 in the swing-in state and can simultaneously serve the purpose of receiving a lead seal arrangement, for example through which a lead seal wire can be pulled. Pivot lever 114 and base plate 168 have setoffs 204 favorable for injection molding technology where material can be saved without endangering the strength of the structural part. Also uniform wall thickness is ensured which is of advantage for injection molding technology.

As is evident in FIG. 21, the thumb 166 is arranged in a 45° position instead of the conventional 90° position. This serves to reduce the lateral space requirement. For similar reasons, according to FIG. 21, an additional right angle-bend 162 can be provided in the actuating bar 18, which provides somewhat more space for the cylinder lock 164 of the pivot lever 114 should this be desirable. The right angle-bend is such that the surface of the right angle-bend bar region that is directed away from the aperture is nearly aligned with the corresponding outer surface of the lock case 16.

It can also be seen in FIG. 21 that the side surface 208 of the holding part 175 reaching behind the door panel forms a unilateral guide for the bar 18, so that folding-away of the bar 18 and hindering of the thumb 166 are prevented.

The pivot lever bar closure according to FIGS. 1 to 26 can be simply installed in the fillet gap of a sheet metal cabinet door because the bar guideway 20 is clipped or slid over the bars 18, as far as these have the structure shown in FIG. 7, whereupon the bar guideways 20 are placed on the stud bolt 58 and fastened with a nut 56 (or alternatively are fastened with a screw bolt fastening). Then, the base part 168 forming the pivot lever seat is installed from the outside. The pinion 62 with the associated actuating mandrel (for example, 152 according to FIG. 26) is inserted and the cap part 71 subsequently slipped over, and the whole fixed with the two screws 72. In the process, the switch cabinet door sheet metal is firmly clamped between the base plate of base 168 or 468 and the slipped-over cap part 71. Displacement forces transmitted from the bars 18 onto the lock are taken up by the base plate not by the clamping-screw connection, so that, unlike the older constructions, there is no danger that the fastening might become loose.

In FIGS. 27A–D, a representation similar to FIGS. 14A–D, a still somewhat more modified embodiment of a base part of base plate 268 is seen, in which only a projection 175 reaches behind the door panel forming a clamping connection. A pivot lever, as shown in FIGS. 28A–D is fitted to the base part. The pivot lever of FIGS. 28A–D is constructed similar to the pivot lever according to FIGS. 20A–D, but somewhat narrower and shorter. It therefore has for a given application even more favorable properties. In particular, the stopping surface 192 is absent, so that the closing thumb receives full freedom of motion. This lends an even greater variety of applications to this bar lever closure. Thus, the pivot lever of FIGS. 28A–D can also be used with a base plate 368 (see FIGS. 29A–D) which is not equipped with a projection 268 reaching behind. Instead, it has a holding part 175, which can be screwed in the region of the second rectangular aperture 34 to the base plate 368. The base plate 368 has for this purpose at the particular shoulder 269 of the base plate 368, bores 267 for holding set screws 265. As seen in FIGS. 29A–D, each set screw presses a clamping elbow 275 against the back face of shoulder 269 and against the inner wall surface of door panel 12 to clamp in the door panel 12. As an alternative, a bow (not shown here) can be used. The bow braces itself with its leg ends on the door panel 12, offers sufficient space for the cylinder 164, and has bores for receiving screws 265. Such a wing would leave the side regions of the cylinder lock 164 free.

If the entire arrangement is to be sealed, which can be of advantage, a cap 375 completely enclosing the cylinder lock 164 can be used, as can be seen in FIGS. 30A-D instead of the bow.

FIGS. 29A-D show, in addition, a further modification of the previous embodiments. Here, the region of the pivot lever bearing an 0-ring sealing 263 can be seen. The base plate has, for this purpose (see also FIGS. 27A-D) a corresponding sunk area 261, similar to the sunk area 94 according to FIG. 14, but for a different purpose. The pivot bearing 310 here has a diameter, which is smaller than the diameter of the sunk area 261 but greater than the circular aperture 259 so that the bearing 310 is held securely. FIGS. 29A-D illustrate how the pinion 262 is slid on the square (in FIGS. 26 labeled 152) and then held firmly by a nut screw 151 screwed onto a threaded bolt 153 extending from the square 152.

The embodiment of FIGS. 29A-D is so narrow in the region of the cylinder lock in this design that the bar 18 can be guided past the cylinder lock 164 without additional right angle-bends.

Figure 30C:
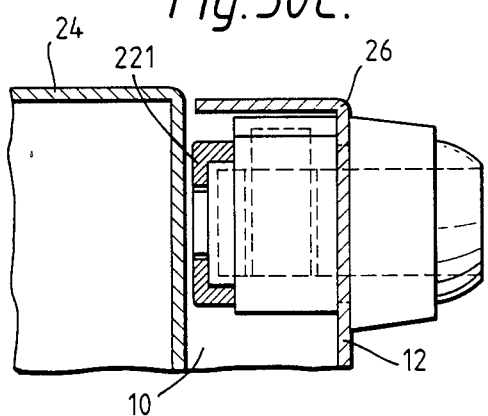
FIG. 30 A-C show respectively front, axial sectional and sectional views of another bar closure using the parts of FIG. 27 (slightly modified) and 28 with cap fastening and two bars operating in opposite directions, with one having a coupling part.

By contrast, in FIGS. 30A-C a separate bar arrangement is provided, specifically an upper bar 218, a middle bar 220, and a lower bar 219. The middle bar 220 is shaped similar to bar 218 but only carries a short shoulder on which a bar coupling piece 221 is applied. Around the closing cylinder and the covering cap 375 establishes a connection to the lower bar 219. This connecting piece, which in FIG. 33 is again emphasized, permits establishing a stable and symmetrical connection in spite of the space largely occupied by the cap 375 in the narrow edged channel 10 of a sheet metal cabinet door. This connection permits turning the bar. For example, to this end solely the screw 223 needs to be screwed out of the threaded bore 212, the nut 151 removed, and by removal of the screw 72 the lock case 16 opened, whereupon the middle bar 220 can be taken out of the lock case and the channel 213. This effected in order to subsequently carry out an installation turned by 180° with the bar 218 simultaneously being moved. After screwing in screws 223, 72, and the nut 151, the direction of rotation for the actuation of the bar closure is changed. The corresponding fastening of the lower bar 219 of coupling 211 does not need to be undone. The slit 214 formed by the coupling receives a cover projection 215 of cap 375, which in FIGS. 32A-D is again emphasized. This permits a given guidance, motion limitation, and a space for sunk fastening holes 216 in the cap 375, with which the cap can be fastened on the base plate using the already mentioned bores 267 and correspondingly longer screws 265.

The bulge 217 shown in the embodiment of FIGS. 32A-D creates a space for the arrangement of a 90° thumb, as can be seen in FIGS. 30A-C at 231. This bulge is not required for 45° thumbs, see reference number 232.

Figure 31C:
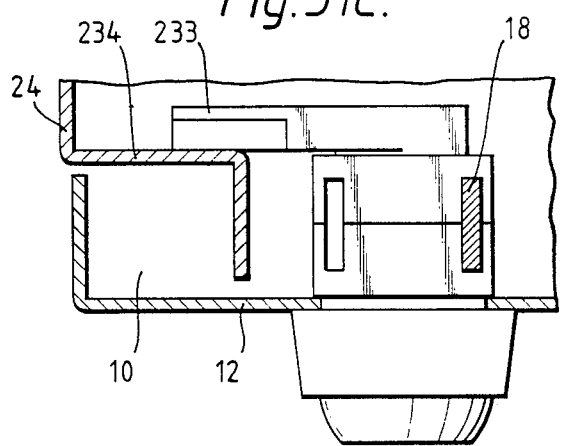
FIGS. 31 A-C show respectively axial sectional, front and sectional views of yet a different bar closure using the parts of FIG. 27 (slightly modified) and 28 with cap fastening and tongue additionally arranged on the lock case for installation outside the fillet gap of a sheet metal door.
Figure 31B:
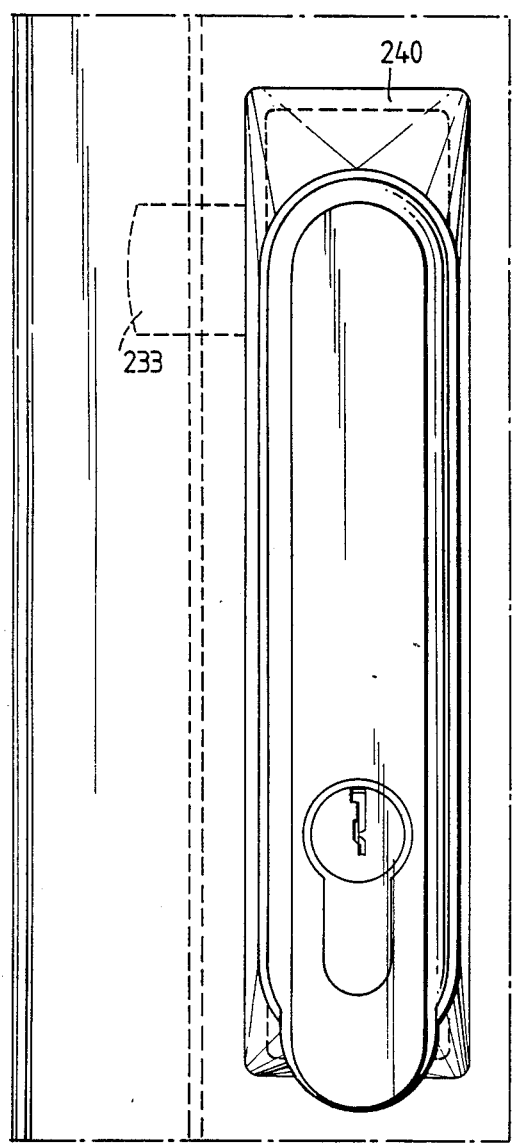
Figure 31A:
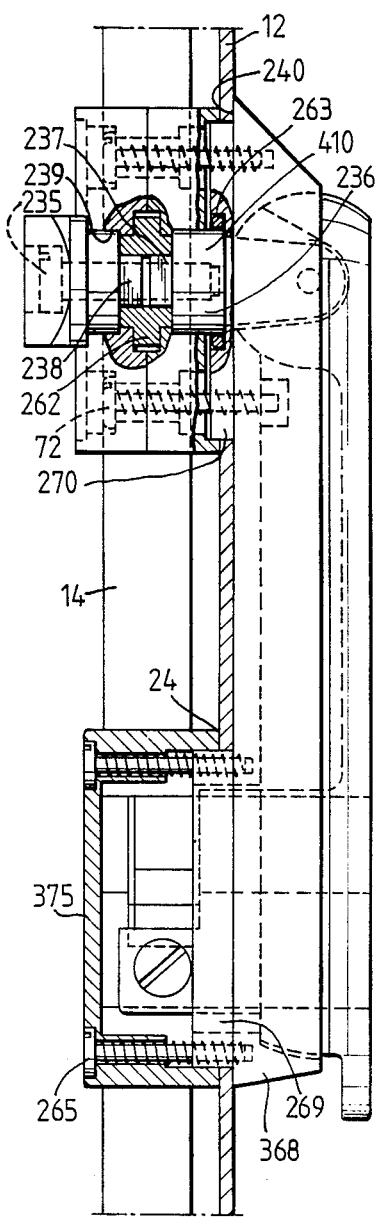
Figure 32A:
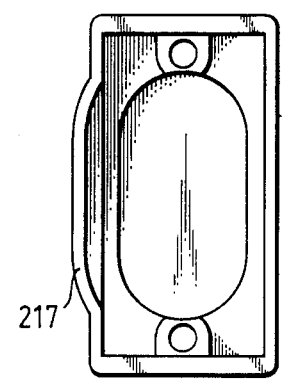
FIGS. 32 A-D show respectively front, axial elevational, rear and sectional views of the fastening cap used in FIG. 30 and 31 with a bulge for the cylinder lock thumb, the latter sectional view taken across section lines 32D—32D of FIG. 31C.
Figure 32B:
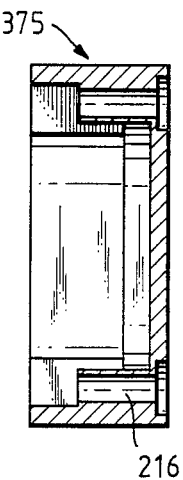
Figure 32C:
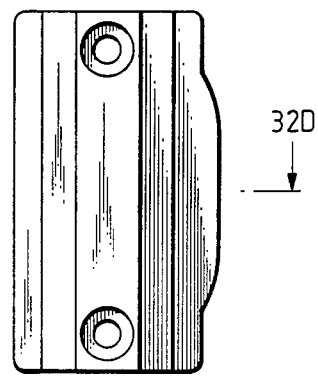
Figure 32D:
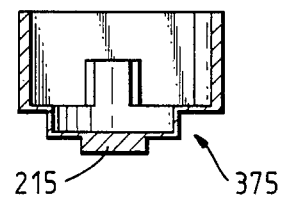
Figure 34A:
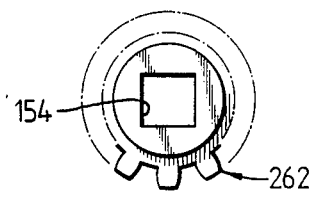
FIGS. 34 A, B show respectively a top and elevational view of a pinion used in the models according to FIGS. 23, 29 and 31.
Figure 34B:
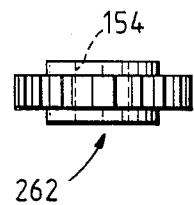
Figure 33A:
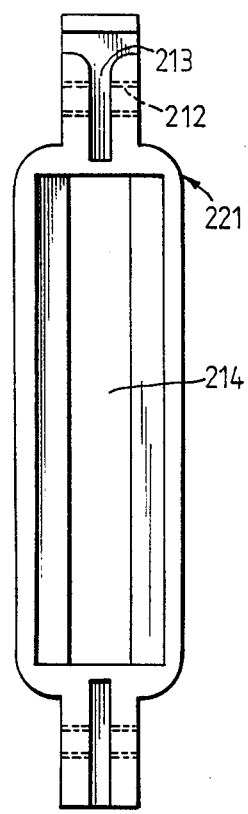
FIGS. 33 A-F show respectively a front view, a left side view of FIG. 33B, a rear view, a cross-section taken across section line 33D—33D of FIG. 33C, a partial left side view of a bar coupling part of FIG. 30A, and a front view of FIG. 33E.
Figure 33B:
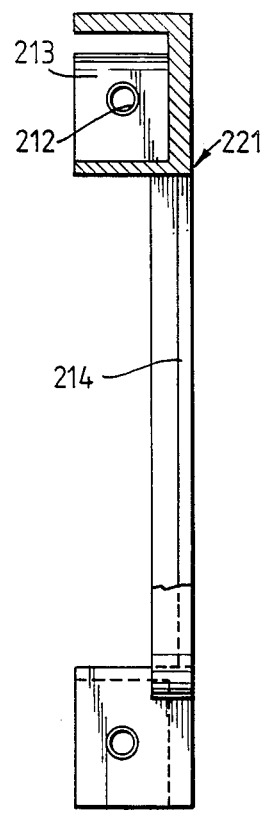
Figure 33C:
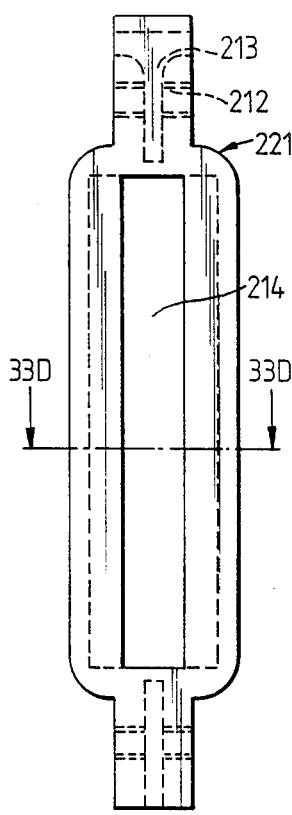
Figure 33D:
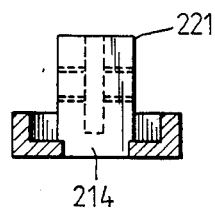
Figure 33E:
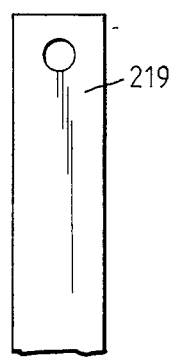
Figure 33F:

FIGS. 31A-C show the use of the bar closure according to FIGS. 29A-D outside the edged channel 10, in which operation takes place with an additional tongue 133, which lies behind an edged area 234 of the body of the cabinet 24 and brings about locking of the door panel 12 (supplementary to the locking by the bar 14). Fastening the tongue 233 can take place with a screw bolt 235 which can be inserted into a corresponding threaded bore of the pivot lever bearing 410. Such threaded bore is also available in FIGS. 19A-C, in the bearing 110 shown there. However, the bearing 410 has a somewhat different form insofar as from the cylindrical bearing part 236 a shortened square 237 extends, which occupies slightly less than half of the square aperture of pinion 262. The other half of the square aperture of pinion 262 is taken up by a square 238, which is a part of tongue 235. This tongue has a bearing part 239 similar to bearing part 236 of the pivot lever bearing. All of these parts are penetrated by a bore holding screw 235. Threads, however, can only be found in the bore in the region of the pivot lever bearing 410, so that the parts 410, 262, and 233 upon the screw 235 being tightened are clamped with each other.

A closure installed according to FIGS. 31A-C is in the sealing region of a switch cabinet. For this reason the sealing cap 375 is provided with the coupling part 375 not being used, since sufficient space is available for arranging the bar 14 or two bars operating in opposite directions. Further sealing measures can also be taken in that the already mentioned 0-ring 263 is available. Sealing leaves can be arranged between the bearing edge regions 240 of the base plate 368 or the door panel 12 surrounding the apertures 32, 34. Further sealing measures are conceivable between the supporting surface of the cap 375 and that of the door panel 12 or 241, as well as possibly in the region of the heads of the screws 265.

It may further be mentioned that the cap 375 is in each instance placed so that it points with its bulging part in the direction of the thumb. This allows a 90° thumb arrangement cylinder lock with thumbs projecting to the right as well as to the left to be used. If exclusively cylinders with 45° thumbs are used, the bulge 217 is not necessary.

It may further be mentioned that the pivot lever bar closure according to the invention is indeed preferentially provided for two apertures of identical size and rectangular shape because this brings out its advantages particularly well. In principle, it would, however, also be possible to design the shoulders so that they are suitable for round apertures, potentially also of different size.

It would also be conceivable to adapt the shoulder intended, for example, for rectangular apertures with an adapter disk and ring to a rectangular aperture of greater dimensions, or also to a round aperture of sufficient size, with the distance of the apertures needing to be appropriate. This could, for example, be of advantage if an available pivot handle closure which requires different and larger apertures is intended to be replaced by a closure according to the invention.

Pivot lever bar closures of the described kind are used, in particular, in the electrical industry for the construction of switch cabinets manufactured of sheet metal.

I claim:

1. A pivot lever bar closure provided with a cylinder lock for installation in two rectangular apertures in a fillet cap of sheet metal cabinet doors, comprising a lock case with a pivot lever actuating device extending through a door panel to the outside for driving at least one closure bar of flat strip material extending parallel to a door edge, the lock case having a cylinder lock holding a pivot lever in a swung-in position, a receiving through for the pivot lever forming a base plate, the base plate connecting the bar closure with the door panel, the base plate having one shoulder that is part of the lock case, said shoulder and another part of the lock case together clamping in the door panel in a region of a first aperture so as to center the base plate, the base plate having another shoulder forming a seat for the cylinder lock and being arranged in an end of the pivot lever, the other shoulder together with a holding part which extends from the other shoulder clamping in the door panel in a region of a second aperture so as to center the base plate, the shoulder which forms a seat for the cylinder lock reaching behind the aperture and carrying one of at least one undercut projection at an edge facing away from the other aperture and a holding part attachable to the shoulder for engaging the rim of the aperture.

2. A pivot lever bar closure as in claim 1, wherein the other shoulder forming a seat for the cylinder lock has a contact surface for a thumb of the cylinder lock.

3. A pivot lever bar closure as in claim 1, wherein the shoulder of the base plate has bores for receiving set screws for a holding part which can be attached to the shoulder.

4. A pivot lever bar closure as in claim 3, wherein the holding part has two clamping elbows.

5. A pivot lever bar closure as in claim 3, wherein the holding part includes a cap encompassing the shoulder of the base plate and the cylinder lock.

6. A pivot lever bar closure as in claim 1, wherein the one shoulder is laid out for round apertures.

7. A pivot lever bar closure as in claim 1, wherein an adapter disk or ring is slid onto the shoulders to permit adaptation to the apertures, said apertures being larger than the shoulders so that the shoulders provided with the adapter disk can be inserted into the apertures.

8. A pivot lever bar closure as in claim 3, wherein the holding part has one bow.

9. A pivot lever bar closure as in claim 6, wherein the round apertures have identical diameters.

10. A pivot lever bar closure as in claim 1, wherein the other shoulder and the holding part are integrally formed in one piece.

11. A pivot lever bar closure provided with a cylinder lock for installation in two rectangular apertures in a fillet gap of sheet metal cabinet doors, comprising a lock case with a pivot lever actuating device extending through a door panel to the outside for driving at least one closure bar of flat strip material extending parallel to a door edge, the lock case having a cylinder lock holding a pivot lever in a swung-in position, a receiving trough for the pivot lever forming a base plate, the base plate connecting the bar closure with the door panel, the base plate having one shoulder that is part of the lock case, said shoulder and another part of the lock case together clamping in the door panel in a region of a first aperture so as to center the base plate, the base plate having another shoulder forming a seat for the cylinder lock and being arranged in an end of the pivot lever, the other shoulder together with a holding part which extends from the other shoulder clamping in the door panel in a region of a second aperture so as to center the base plate, the other shoulder of the base plate reaches behind the aperture receiving the cylinder lock at an edge facing away from the other aperture with at least one undercut projection.

12. A pivot lever bar closure as in claim 11, wherein the undercut projection has an oblique area with an angle directed toward the outside at which the base plate can be inserted into the associated aperture before insertion into the other aperture.

13. A pivot lever bar closure provided with a cylinder lock for installation in two rectangular apertures in a fillet gap of sheet metal cabinet doors, comprising a lock case with a pivot lever actuating device extending through a door panel to the outside for driving at least one closure bar of flat strip material extending parallel to a door edge, the lock case having a cylinder lock holding a pivot lever in a swung-in position, a receiving through for the pivot lever forming a base plate, the base plate connecting the bar closure with the door panel, the base plate having one shoulder that part of the lock case, said shoulder and another part of the lock case together clamping in the door panel in a region of a first aperture so as to center the base plate, the base plate having another shoulder forming a seat for the cylinder lock and being arranged in an end of the pivot lever, the other shoulder together with a holding part which extends from the other shoulder clamping in the door panel in a region of second aperture so as to center the base plate, the lock case comprises a pinion for driving perforated or denticulated closure bars of flat strip material, which are supported axially displaceable in the lock case, a lock nut carrying the pinion and held rotatably in a lock nut and bar bearing, an actuating shaft for rotating said lock nut and bar bearing and being brought through the first aperture to the outside anD carrying the pivot lever, the lock nut and bar bearing of the lock of the pivot lever bar closure supporting a base part formed by the base plate which supports the one end of the lock nut, a cap part which can be set onto the base part and is connectable therewith and which supports the other end of the lock nut and which has guide slits for the bars.

14. A pivot lever bar closure as in claim 13, wherein the cap part has a central opening in the cap bottom for bearing the lock nut and one lug arranged above and below the central opening and projecting into the interior of the cap with a sunk bore for holding a set screw.

15. A pivot lever bar closure as in claim 13, wherein from the cap bottom two longer sidewalls extend parallel to the guide slits and two shorter side walls perpendicular thereto and end edges of the shorter side walls are connected with support and guide walls projecting in each instance into the interior of the cap, which are in each instance arranged at a distance parallel to the longer side wall and form the guide slit.

16. A pivot lever bar closure as in claim 13, wherein the lock nut and bar bearing has a base part and a cap part of substantially identical structure.

17. A pivot lever bar closure as in claim 13, wherein the base part and the cap part are preassembled with tubular rivets leading through the sunk bores.

18. A pivot lever bar closure as in claim 13, further comprising tappets projecting from a connecting plane for the base and cap parts and engaging corresponding setoffs, said tappets being on one of said base and cap parts, said setoffs being in the other of said base and cap parts, and annular projections extending from the edges of the sunk bores which fittingly engage correspondingly enlarged sunk bores of the other of said base and cap parts.

* * * * *